UNITED STATES PATENT OFFICE.

K. W. HOLMES, OF WINONA, MINNESOTA, AND ANDREW ALBRIGHT, OF NEWARK, NEW JERSEY; SAID HOLMES ASSIGNOR TO SAID ALBRIGHT.

IMPROVEMENT IN COATING WOOD WITH RUBBER, GUTTA PERCHA, &c.

Specification forming part of Letters Patent No. 64,419, dated May 7, 1867; reissue No. 5,343, dated April 1, 1873; application filed March 6, 1873.

*To all whom it may concern:*

Be it known that KIRK W. HOLMES, now of Winona, Minnesota, and ANDREW ALBRIGHT, now of Newark, New Jersey, do hereby declare that the following is a full and exact description of their invention for Coating Wood with Rubber and Gutta Percha.

Our invention consists in coating or lining wooden articles with rubber, gutta percha, or other known vulcanizable gum, and then vulcanizing the gum while on the wood.

The wooden article to be "coated" is first made of the desired form, is properly seasoned or cleaned, and thus made ready for the application of the rubber.

The rubber or other gum may be made in the usual proportions of two parts of rubber to one part of sulphur properly kneaded and rolled into thin sheets of paste; or the "paste" of rubber or rubber-coating may be made so much thinner by naphtha or any other known solvent, mechanical or chemical, as to be applied to the wooden article by a brush, or by dipping.

The form and thickness of rubber or gum paste is adapted to the character of the article to which it is to be applied. To large articles with smooth surfaces it may be applied in sheets of tolerably stiff paste; to smaller and more ornamental articles it may be applied (by using a thinner paste made by the use of some solvent) with a brush or by dipping; but either kind of coating may be used for both large or small articles. After the article to be covered is properly coated it is placed in a boiler or vulcanator with or without a mold or packing and subjected to the usual vulcanizing dry or steam heat, until the paste of rubber is properly vulcanized, when it will be found that the wooden article is beautifully coated with a coating of "hard rubber."

This process is well adapted to preserving, strengthening, and beautifying a great variety of wooden articles, such as wagon-bodies, coffins, picture-frames, trays, house or table furniture, and all articles of wood to which a rubber finish is desirable.

Sometimes, in order to make the stiff paste keep close to the wood, or to prevent the wood from warping by the heat, it is necessary to secure the article in a suitable mold or packing while in the vulcanizer.

When a high degree of polish is wished, after the removal from the vulcanizer, the rubber surface is polished in the usual manner.

The rubber composition may be colored, hardened, or perfumed by the addition of articles commonly used for such purposes.

What I claim as the invention of myself and K. W. HOLMES, is—

The process herein described of coating or lining wooden articles with vulcanized rubber, gutta percha, or other known vulcanizable gum.

ANDREW ALBRIGHT,
*For himself as joint inventor and as assignee of other joint inventor.*
KIRK W. HOLMES.

Witnesses:
J. C. CLAYTON,
F. C. BOWEN,
A. H. BISSELL,
O. W. WILLIAMS.